United States Patent
Kolesnik

(10) Patent No.: US 9,866,537 B2
(45) Date of Patent: Jan. 9, 2018

(54) SYSTEMS AND METHODS FOR LONG UNIVERSAL RESOURCE LOCATOR COMPRESSION

(71) Applicant: salesforce.com, inc., San Francisco, CA (US)

(72) Inventor: Aleksey Kolesnik, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/450,087

(22) Filed: Aug. 1, 2014

(65) Prior Publication Data

US 2015/0039906 A1    Feb. 5, 2015

Related U.S. Application Data

(60) Provisional application No. 61/861,599, filed on Aug. 2, 2013.

(51) Int. Cl.
- *G06F 17/30* (2006.01)
- *H04L 29/06* (2006.01)
- *H04L 29/08* (2006.01)

(52) U.S. Cl.
CPC .... *H04L 63/0435* (2013.01); *G06F 17/30864* (2013.01); *H04L 67/22* (2013.01); *H04L 63/0428* (2013.01); *H04L 67/02* (2013.01)

(58) Field of Classification Search
CPC ..... H04L 63/0435; H04L 67/22; H04L 67/02; H04L 63/0428; G06F 17/30864

USPC ........................................................ 713/190
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |

(Continued)

*Primary Examiner* — Harunur Rashid
(74) *Attorney, Agent, or Firm* — Lorenz & Kopf LLP

(57) ABSTRACT

Methods and systems for managing universal resource locators (URLs) at a server include receiving, at the server, a search query from a client device; creating, by the server, a compressed hash value based on the search query; processing, by the server, the search query to yield a search result; and transmitting the compressed hash value to the client for storage in a browser history.

16 Claims, 6 Drawing Sheets

(56) References Cited

U.S. PATENT DOCUMENTS

| | | | |
|---|---|---|---|
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,539,776 B1* | 5/2009 | Saare | G06F 17/30887 709/230 |
| 7,620,655 B2 | 11/2009 | Larsson et al. | |
| 7,698,160 B2 | 4/2010 | Beaven et al. | |
| 7,779,475 B2 | 8/2010 | Jakobson et al. | |
| 7,831,609 B1* | 11/2010 | Alexander | G06F 17/30887 707/765 |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 2001/0044791 A1 | 11/2001 | Richter et al. | |
| 2002/0072951 A1 | 6/2002 | Lee et al. | |
| 2002/0078136 A1* | 6/2002 | Brodsky | G06F 17/30864 709/203 |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2002/0188665 A1* | 12/2002 | Lash | G06F 17/30902 709/203 |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1* | 4/2003 | Laane | G06F 17/30899 715/234 |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0049598 A1* | 3/2004 | Tucker | G06F 17/30899 709/246 |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0215608 A1* | 10/2004 | Gourlay | G06F 17/30864 |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2008/0249972 A1 | 10/2008 | Dillon | |
| 2008/0307044 A1* | 12/2008 | Musson | G06F 17/30876 709/203 |
| 2009/0063414 A1 | 3/2009 | White et al. | |
| 2009/0100342 A1 | 4/2009 | Jakobson | |
| 2009/0177744 A1 | 7/2009 | Marlow et al. | |
| 2012/0233137 A1 | 9/2012 | Jakobson et al. | |
| 2013/0218948 A1 | 8/2013 | Jakobson | |
| 2013/0218949 A1 | 8/2013 | Jakobson | |
| 2013/0218966 A1 | 8/2013 | Jakobson | |

* cited by examiner

FIG. 2

SYSTEMS AND METHODS FOR LONG UNIVERSAL RESOURCE LOCATOR COMPRESSION

CROSS-REFERENCE TO RELATED APPLICATIONS

This application claims the benefit of U.S. provisional patent application Ser. No. 61/861,599 filed Aug. 2, 2013, the entire contents of which is incorporated herein by this reference.

TECHNICAL FIELD

Embodiments of the subject matter described herein relate generally to computer systems and applications for searching websites, databases and files, and more particularly to techniques for shortening universal resource locator (URLs) to avoid exceeding browser history storage limitations.

BACKGROUND

Software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features, such as database searching, between multiple sets of users.

Presently known techniques for storing browser histories can result in unexpected errors during extended searches. In particular, many browsers (e.g., Internet Explorer™, Firefox™) limit the length of URLs which may be stored in hash, for example, to 2082 characters. If this length is exceeded, such as when conducting extended searches employing multiple search filters, the browser may be unable to correctly parse the URL. Consequently, erroneous data may be displayed when using the Forward and Back keys to navigate. Systems and methods are thus needed for compressing URLs in a manner consistent with existing browser history storage paradigms.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

FIG. 2 is an exemplary screen shot of a search page within a browser window in accordance with an embodiment;

DETAILED DESCRIPTION

Embodiments of the subject matter described herein generally relate to systems and methods for compressing long URLs.

On-demand or multi-tenant database system and service environments such as SALESFORCE.COM™ typically include a search feature which allows users to interrogate one or more databases, websites, or file systems, often using a plurality of filters to recursively refine the search.

Some web-based browsers may have limits on the character lengths of Uniform Resource Locators (URLs), such as Internet Explorer™ having a limit of approximately 2082 characters. Existing methods of shortening URLs involve building a table of aliases such that a particular URL is mapped to a particular shortened URL. This method of shortening URLs is disadvantageous in a context where a user may be generating longer and longer URLs while browsing an on-demand services environment through a browser. The URLs being created may represent actions being taken by the user, such as adding particular contacts to a database, increasing the complexity of a search query by adding search filters, and the like.

Rather than storing long URLs in an alias table and mapping them to short URLs, such as the Bitlink approach employed by bitly.com/shorten/ and others, long URLs may be generated and compressed at the server in real time. In particular, a client device may generate a URL and send it to a server such that the server compresses the URL and sends the compressed URL back to the client. As a result, the problem of clicking the back and/or forward button is solved because the client device sends the compressed URL to the server to uncompress the URL, thereby avoiding the problem of exceeding the URL length imposed by presently known browser storage hashes. In one embodiment, the server searches a table to determine whether the generated URL has previously been compressed.

Figure 1:
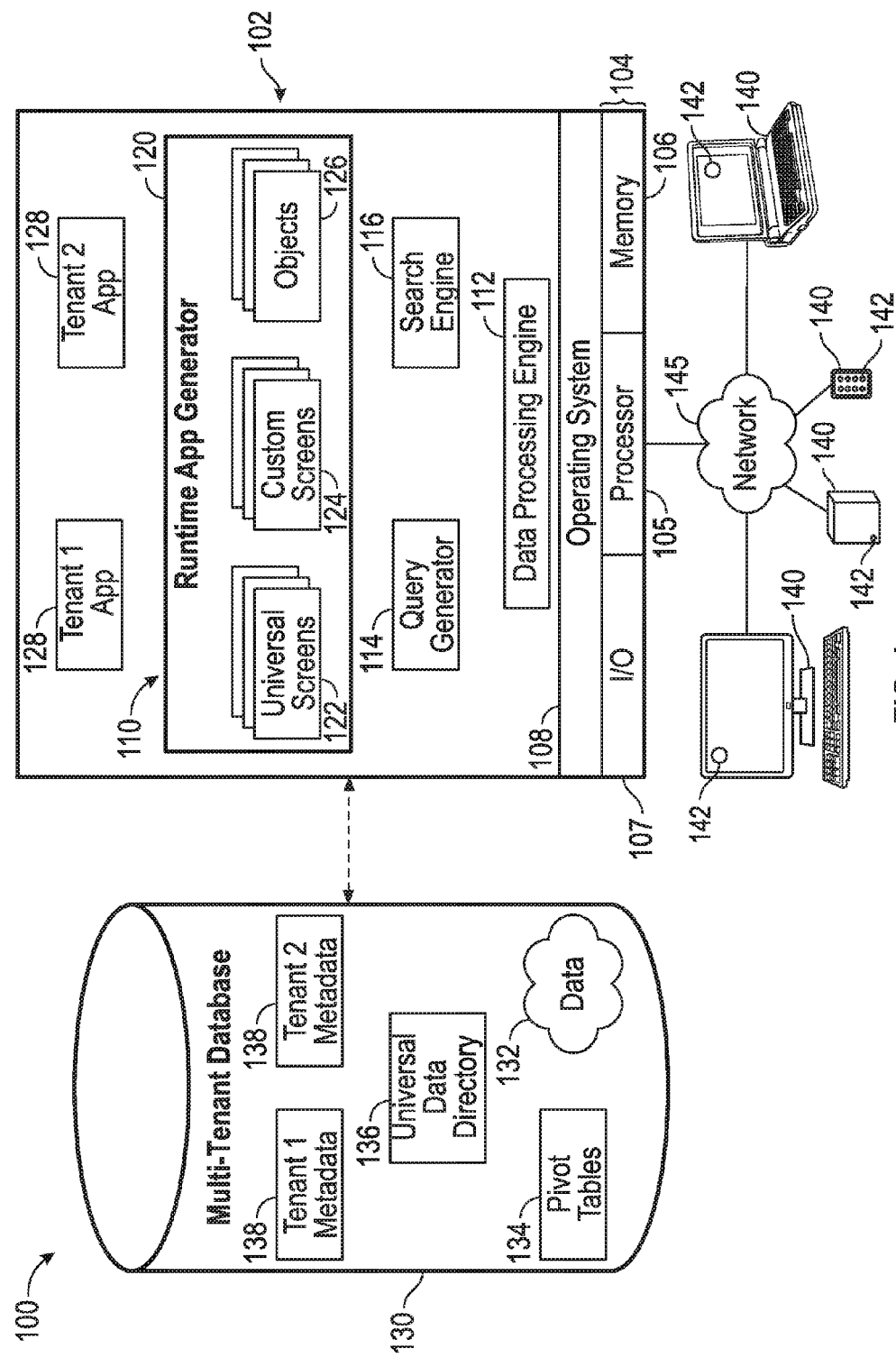
FIG. 1 is a schematic block diagram of a multi-tenant computing environment in accordance with an embodiment.

Turning now to FIG. 1, an exemplary cloud based solution may be implemented in the context of a multi-tenant system 100 including a server 102 that supports applications 128 based upon data 132 from a database 130 that may be shared between multiple tenants, organizations, or enterprises, referred to herein as a multi-tenant database. Data and services generated by the various applications 128 are provided via a network 145 to any number of client devices 140, such as desk tops, laptops, tablets, smartphones, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the service cloud 100. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128. In various embodiments, application 128 embodies the functionality of a search engine including a compression module for creating a compressed version of a search query, URL, or the like, as described below.

Figure 2:
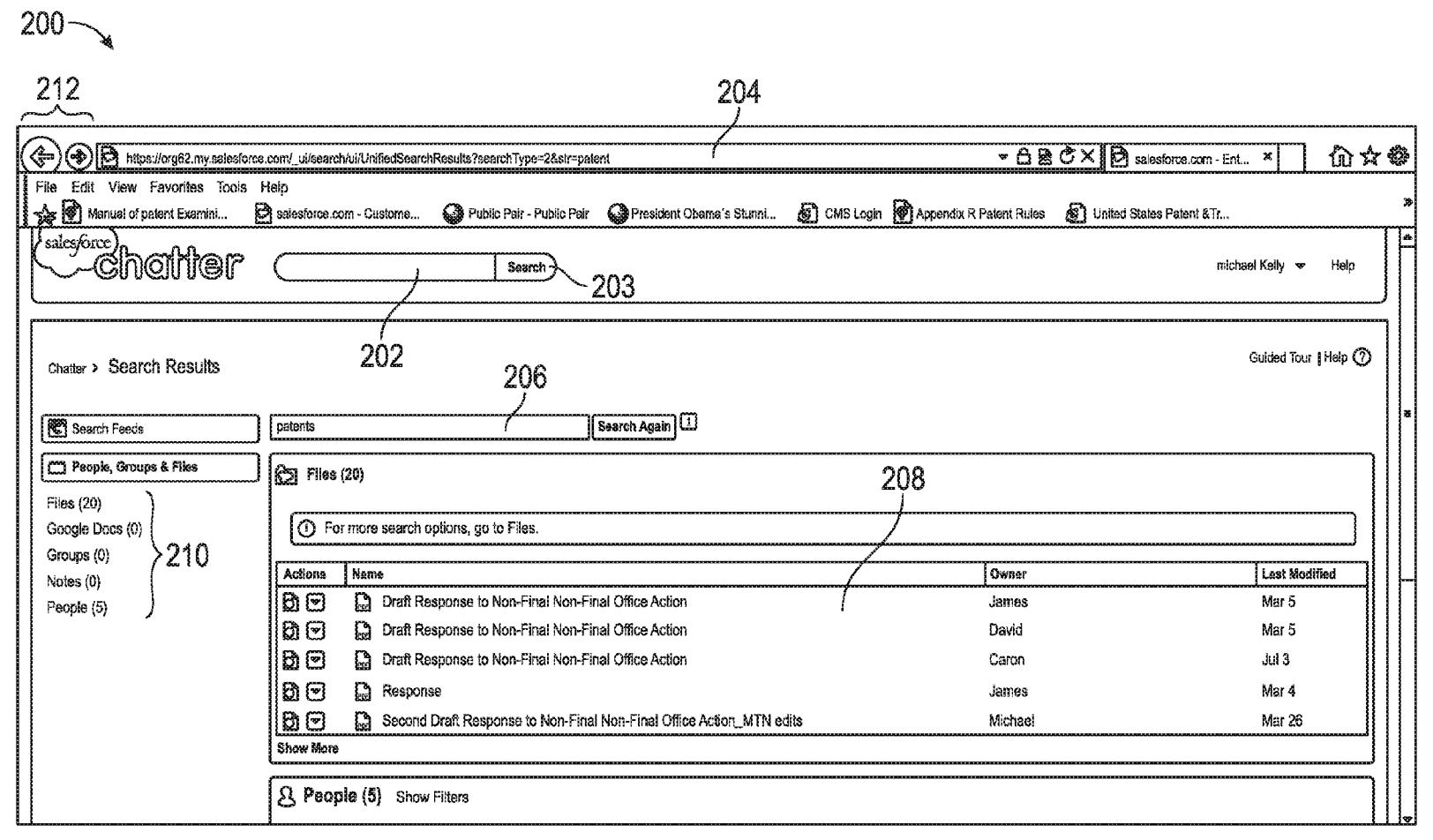

Referring now to FIG. 2, an exemplary screen shot of a search page 200 within a browser window includes a search bar 202, an address bar 204, a "search again" (refine search) field 206, a search results display area 208, and a plurality of search filters 210. To conduct a search of a remote database (not shown), the user enters one or more search terms (e.g., "patent") into the search bar 202, whereupon the browser appends the search term to the URL inside the address bar 204. When the user clicks the search button 203, the browser transmits the URL to the server associated with the search engine, as described in greater detail below in connection with FIGS. 4 and 5.

After the search query is received and processed by the server, the results are sent back to the client device and displayed in the search results display area 208. To further refine (narrow) the search and thereby reduce the number of search results, the user may either: i) add another search term into field 206; or ii) select one or more search filters (typically categories) 210. In either case, the browser appends the additional search metrics to the URL within the address bar 204, and transmits the revised search query to the server.

Figure 3:
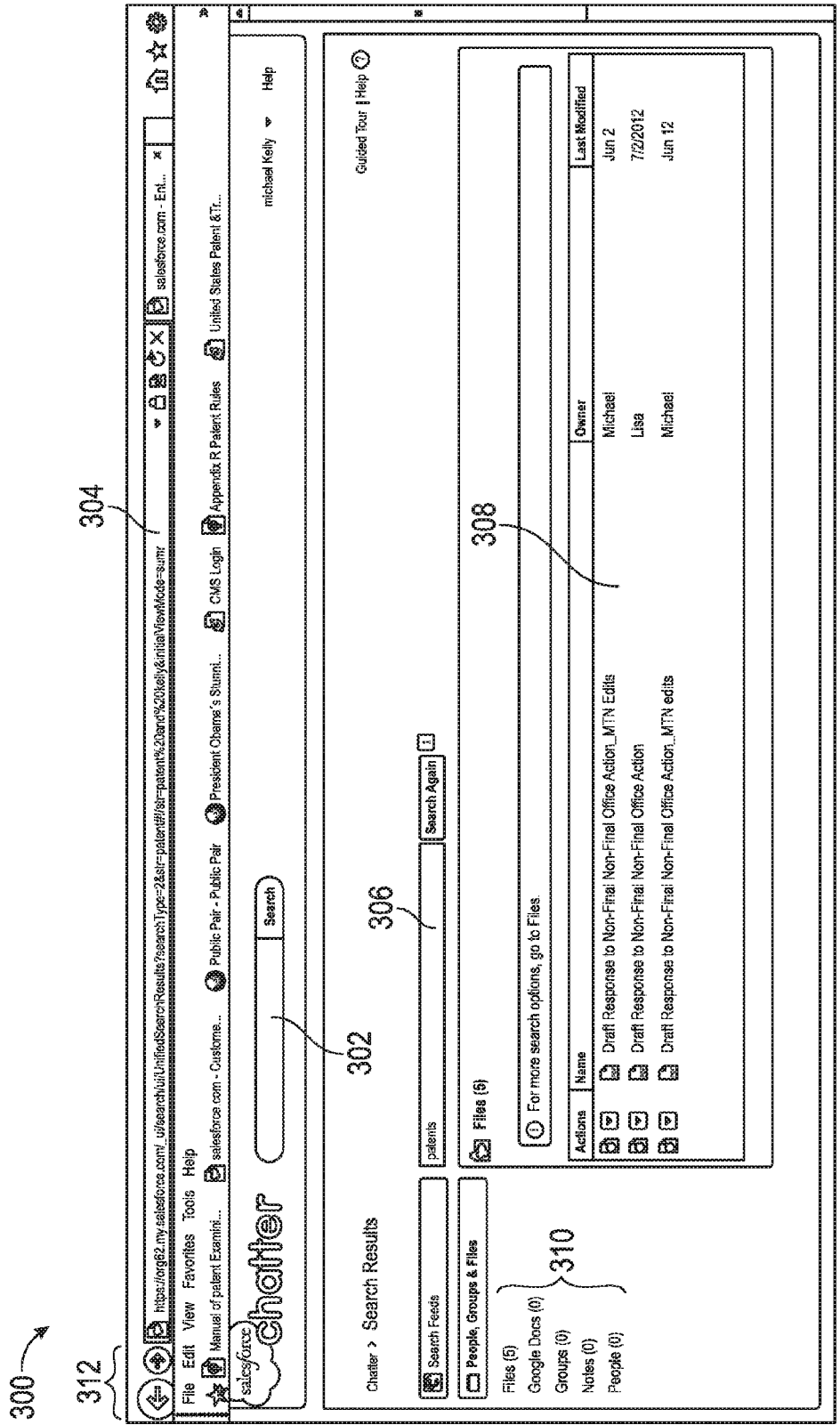
FIG. 3 is an exemplary screen shot of the search page of FIG. 2, illustrating how increasing search complexity increases URL length in accordance with an embodiment.

Referring now to FIG. 3, an exemplary screen shot of the search page 300 (generally analogous to FIG. 2) illustrates how increasing search complexity increases URL length. In particular, when a user adds the additional search term "kelly" to the "search again" field 306 or, alternatively, selects one or more search filters (categories) 310, the browser appends the additional search terms to the then current URL in the address bar 304. One problem encountered with this approach is that many browsers limit the number of characters associated with URLs stored in the browser history cache. For example, if a particular browser has defines the maximum URL character length to be 2082, and the actual URL character length transmitted to the server exceeds 2082 characters, an error may occur when using the Forward and Back keys (212, 312) during subsequent navigation. That is, while the user may intend to go back to a previous results page by clicking the Back key, the URL retrieved from the browser history cache may actually be a truncated value of the actual previous URL due to storage limitations associated with the browser history cache (or simply "browser history").

Figure 4:
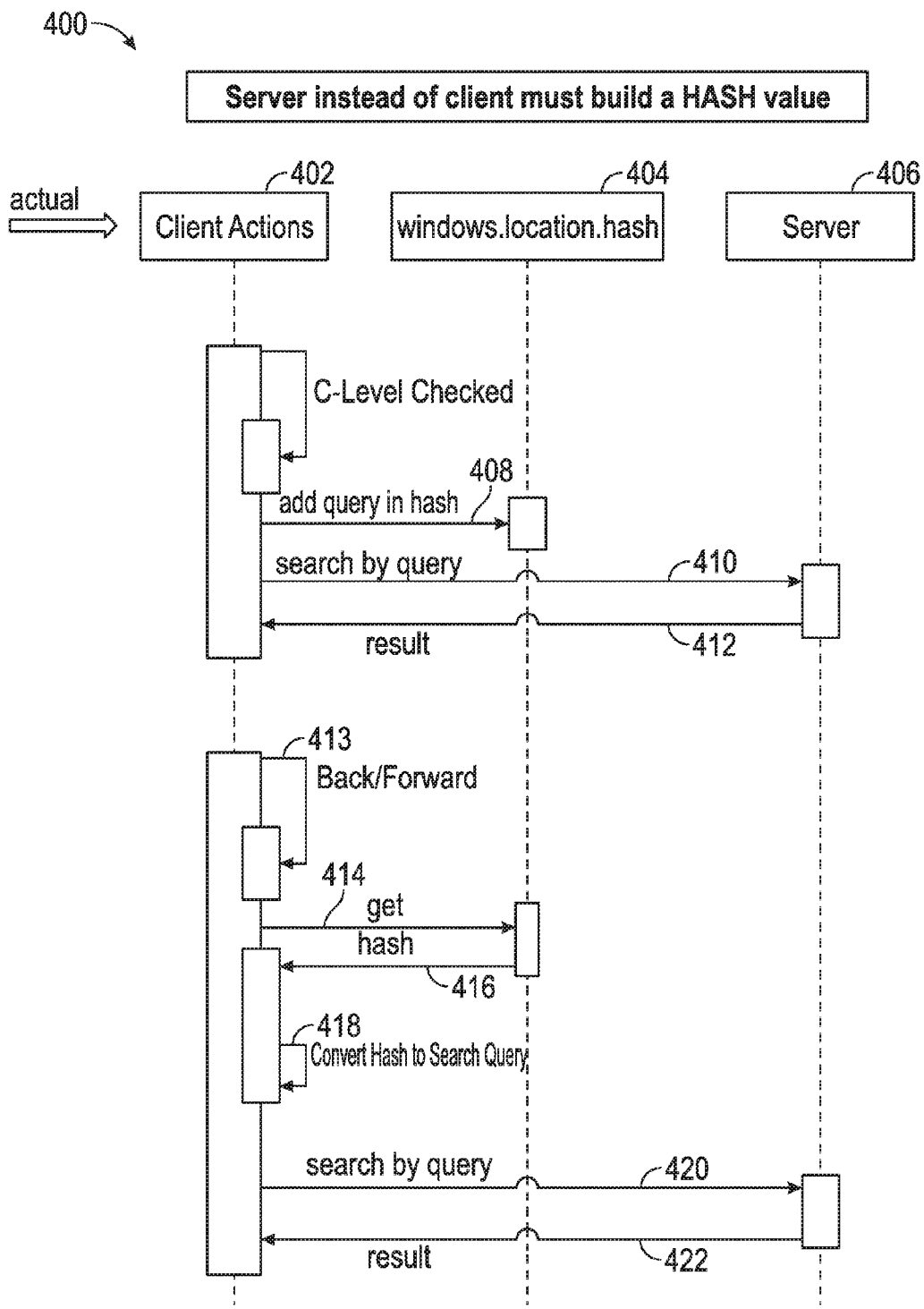
FIG. 4 is a process diagram illustrating the interaction among a client, a browser history storage hash, and a server in the context of a typical search-by-query sequence in accordance with an embodiment.

Referring now to FIG. 4, a process diagram 400 illustrates the interaction between a client 402 having a browser history storage cache 404 (e.g., windows.location.hash), and a server 406 in the context of a typical search-by-query operation. More particularly, once a search query is defined by a user, for example, by entering search terms into a search bar as described above in connection with FIGS. 2 and 3, the browser adds the URL (which embodies the query) to the cache 404 (step 408). The query is then sent from the client 402 to the server 406 for processing (step 410). The server 406 processes the request, for example, by interrogating a database or other data storage/retrieval module, and transmits the search results back to the client 402 (step 412). As long as the length of the URL stored in the cache 404 does not exceed the character length limit (e.g., 2082 characters) imposed by the browser cache, the user may navigate using the forward and back keys (step 413) without compromise.

However, once the URL embodying the query exceeds the character length prescribed by the browser cache 404, the URL is effectively truncated by the browser cache. Consequently, when a URL is retrieved from cache in response to a forward/back navigation (step 414), the conversion to a new query is corrupted (step 418) in the sense that the intended query is replaced by the truncated URL retrieved from the cache. As a result, an incorrect page may be displayed to the user. Specifically, the truncated URL may be inadvertently sent from the client to the server (step 420), prompting the server to return an incorrect results page to the client (step 422).

The foregoing problem may be alleviated in accordance with the present invention by using a hashed (compressed) expression of the URL in the client side cache, thereby ensuring that the permissible character length imposed by the browser cache is not exceeded. In various embodiments, this may be accomplished by building the hash value at the server, and transmitting it to the client for storage of the hash value in the browser cache.

Figure 5:
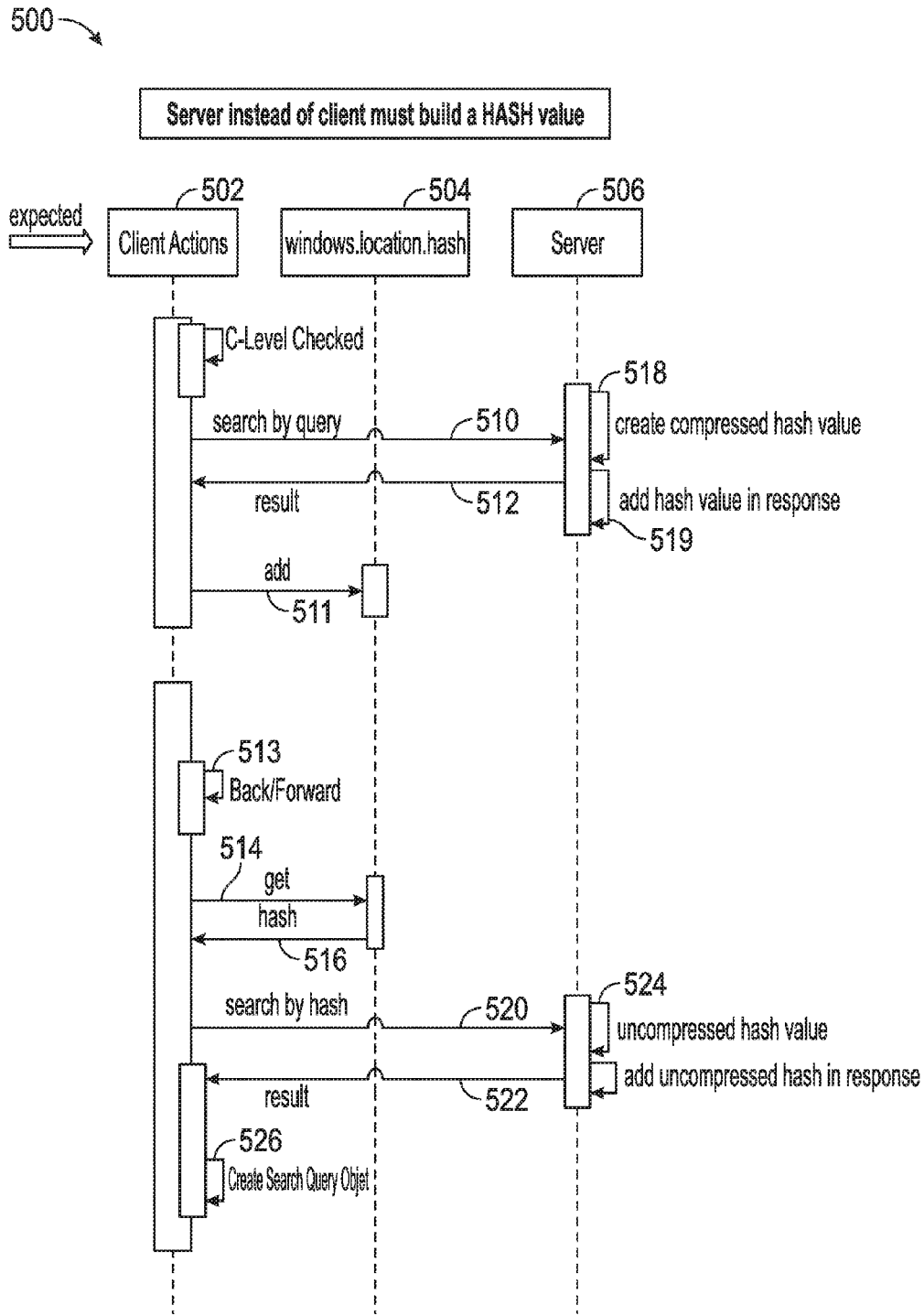
FIG. 5 is a process diagram generally analogous to FIG. 4, illustrating the creation of compressed URLs at the server in accordance with an embodiment.

More particularly and referring now to FIG. 5, a process diagram 500 illustrates the interaction between a client 502 having a browser history storage cache 504, and a server 406 in the context of the present invention in which compressed URLs are created at the server and returned to the client device for placement in the browser history cache. In particular, a search query is constructed by the user, for example, as described above in connection with FIG. 4, and the search query sent by the client to server for processing (step 510). In addition to processing the search query, the server 506 creates a compressed hash value, for example by decrypting the URL received from the client, appends the compressed hash value to the search results (step 519), and transmits both the search results and the compressed hash value back to the client 502 (step 512). The client then writes the compressed hash value to the browser storage cache (step 511). By storing a compressed version of the URL in the browser cache instead of the uncompressed version, the character length limit imposed by the browser storage cache is less likely to be encountered.

With continued reference to FIG. 5, when the forward/back keys are used to navigate forward or backward through the search operation (step 513), the appropriate compressed hash value is retrieved from the storage module 504 (step 514) and sent to the server 506 (step 520). The server 506 then uncompresses the hash value received from the client 501, for example, using Base 64 or other suitable encryption protocols (step 524), and transmits the uncompressed hash value back to the client 502 (step 522). The client 502 may then create a search query object using the uncompressed hash value (step 526), and transmit the query to the server to further refine the search.

Figure 6:
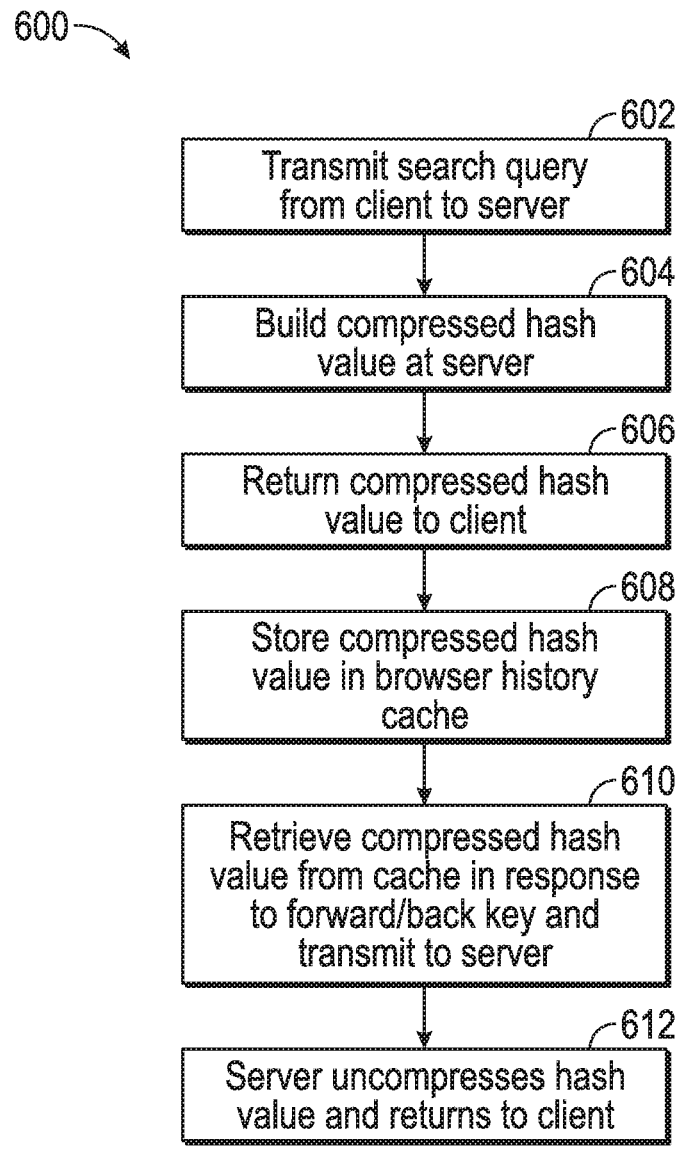
FIG. 6 is a flow chart depicting a method for creating compressed hash values at the server in accordance with an embodiment.

FIG. 6 is a flow chart depicting a method 600 for long URL compression which involves creating compressed hash values at the server. More particularly, the method 600 includes sending (Task 602) a search query from a client to a server, and creating (Task 604) a compressed hash value at the server based on the query. The server then returns (Task 606) the compressed hash value to the client. The client then stores (Task 608) the compressed hash value in the browser history cache. When the user clicks a forward or back key, the client retrieves the previously stored compressed hash value from the browser history and sends it to the server (Task 610), whereupon the server uncompresses the hash value and sends the uncompressed version back to the client for parsing (Task 612).

A method is thus provided for managing universal resource locators (URLs) at a server. The method includes receiving, at the server, a search query from a client device; creating, by the server, a compressed hash value based on the search query; processing, by the server, the search query to yield a search result; and transmitting the compressed hash value to the client for storage in a browser history cache.

In an embodiment, the method further includes transmitting the search result to the client device.

In an embodiment, the method also includes appending the compressed hash value to the search result and simultaneously transmitting the search result and the appended compressed hash value to the client device.

In an embodiment, the method further includes receiving by the server, from the client device, the compressed hash value.

In an embodiment, the method further includes uncompressing, by the server, the compressed hash value received from the client device.

In an embodiment, the method further includes transmitting, by the server, the uncompressed hash value to the client device.

In an embodiment, creating comprises decrypting the search query.

In an embodiment, decrypting comprises compressing the search query using Base 64 encryption protocols.

A server system is also provided. The server system includes a searchable database and a search engine configured to interrogate the database and generate a search result based on a search query received from a client device. The server system may also include a processor configured to: create a compressed hash value based on the received search query; and transmit the compressed hash value and the search result to the client device.

In an embodiment, the processor is further configured to simultaneously transmit the search result and the appended compressed hash value to the client device.

In an embodiment, the processor is further configured to receive, from the client device, a re-transmitted version of the compressed hash value.

In an embodiment, the processor is further configured to uncompress re-transmitted version of the compressed hash value.

In an embodiment, the processor is further configured to transmit the uncompressed hash value to the client device.

In an embodiment, the processor is further configured to receive, from the client device, a search query object based on the uncompressed hash value.

In an embodiment, uncompressing comprises encrypting, and compressing comprises decrypting, using Base 64 encryption protocols.

A computer application embodied in a non-transitory medium is also provided. The computer application is configured to cause a server to: receive a search query from a client device; create a compressed hash value of the search query; and transmit the compressed hash value to the client device.

In an embodiment, the computer application is further configured to cause the server to: generate a search result from the search query; append the compressed hash value to the search result; and simultaneously transmit the compressed hash value and the search result to the client device.

In an embodiment, the computer application is further configured to cause the server to: receive, from the client device, a retransmitted version of the compressed hash value; uncompress the retransmitted version of the compressed hash value; and transmit the uncompressed hash value to the client device.

In an embodiment, the computer application is further configured to cause the server to cause the server to receive, from the client device, a search query object based on the uncompressed hash value.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. A method comprising:
   receiving, at a server via a network, a search query from a client device, the search query comprising one or more search metrics defined by a user and appended to a uniform resource locator (URL) by a browser executed by the client device wherein the URL is received in a first state of an uncompressed URL for storing in a cache of a browser history, and for enabling use of a forward or back key to navigate forward or backward in the browser history cache in instances of the URL length exceeding a predefined cache character length limit of the browser history cache by converting the URL from the first state of the uncompressed URL to a second state of a compressed URL prior to storing the URL in the browser history cache wherein the second state of the compressed URL is a truncated URL having a cache character length not exceeding the predefined cache character length limit of the browser history cache wherein the predefined cache character length limit is in the vicinity of less than or equal to 2082 characters;

creating, by the server, a compressed hash value based on the search query, wherein the compressed hash value comprises a compressed version of the search query wherein creating the compressed version of the search results by decrypting by the server the uncompressed URL;

processing, by the server, the search query to yield a search result; and transmitting, by the server to the client device via the network, the search result and the compressed hash value for storage in a browser history cache of the client device wherein: receiving the search query comprises the browser appending the one or more search terms to the URL inside an address bar within a browser window when the user enters the one or more search terms into a search bar within the browser window and transmitting the URL and the one or more search terms appended thereto when the user clicks a search button within the browser window; and the search result is displayed in a search results display area of the browser window wherein: decrypting comprises compressing the search query using base 64 encryption protocols.

2. The method of claim 1, further comprising transmitting the search result to the client device.

3. The method of claim 1, further comprising appending the compressed hash value to the search result and simultaneously transmitting the search result and the appended compressed hash value to the client device.

4. The method of claim 1, further comprising receiving by the server, from the client device, the compressed hash value.

5. The method of claim 4, further comprising uncompressing, by the server, the compressed hash value received from the client device.

6. The method of claim 5, further comprising transmitting, by the server, the uncompressed hash value to the client device.

7. The method of claim 1, further comprising:

receiving by the server, from the client device, the compressed hash value previously stored in the browser history cache when the forward or back key is used to navigate forward or backward;

uncompressing, by the server, the compressed hash value received from the client device; and transmitting, by the server, the uncompressed hash value to the client device, wherein the client device creates a second search query using the uncompressed hash value.

8. The method of claim 1, wherein the compressed hash value is stored in the browser history cache instead of an uncompressed version of the search query.

9. A server system, comprising:

a searchable database;

a search engine to interrogate the database and generate a search result based on a search query received from a client device via a network, wherein the search query comprises one or more search metrics defined by a user and appended to a uniform resource locator (URL) by a browser executed by the client device wherein the URL is received in a first state of an uncompressed URL to store in a cache of a browser history, and to enable use of a forward or back key to navigate forward or backward in the browser history cache in instances of the URL length exceeding a predefined cache character length limit of the browser history cache by converting the URL from the first state of the uncompressed URL to a second state of a compressed URL prior to the URL stored in the browser history cache wherein the second state of the compressed URL is a truncated URL having a cache character length not exceeding the predefined cache character length limit of the browser history cache wherein the predefined cache character length limit is in the vicinity of less than or equal to 2082 characters; and a processor to:

create, by a server, a compressed hash value based on the received search query, wherein the compressed hash value comprises a compressed version of the received search query wherein to create the compressed version of the received search query, the uncompressed URL is decrypted by the server; and transmit, by the server, the compressed hash value and the search result to the client device via the network, wherein the compressed hash value is stored in a browser history cache of the client device wherein: the search query received comprises the browser appending the one or more search terms to the URL inside an address bar within a browser window when the user enters the one or more search terms into a search bar within the browser window and transmitting the URL and the one or more search terms appended thereto when the user clicks a search button within the browser window; and the search result is displayed in a search results display area of the browser window wherein: the decrypted step by the server comprises compressing the search query using base 64 encryption protocols.

10. The server system of claim 9, wherein the processor simultaneously transmits the search result and the appended compressed hash value to the client device.

11. The server system of claim 9, wherein the processor receives, from the client device, a re-transmitted version of the compressed hash value.

12. The server system of claim 11, wherein the processor uncompresses the re-transmitted version of the compressed hash value.

13. The server system of claim 11, wherein the processor transmits the uncompressed hash value to the client device.

14. The server system of claim 13, wherein the processor receives, from the client device, a search query object based on the uncompressed hash value.

15. A non-transitory computer-readable medium having instructions stored thereon that, when read and executed by a processor of a server, cause the server to:

receive a search query from a client device via a network, the search query comprising one or more search metrics defined by a user appended to a uniform resource locator (URL) by a browser executed by the client device wherein the URL is received in a first state of an uncompressed URL to store in a cache of a browser history, and to enable use of a forward or back key to navigate forward or backward in the browser history cache in instances of the URL length exceeding a predefined cache character length limit of the browser history cache by converting the URL from the first state of the uncompressed URL to a second state of a compressed URL prior to the URL stored in the browser history cache wherein the second state of the compressed URL is a truncated URL having a cache character length not exceeding the predefined cache character length limit of the browser history cache wherein the predefined cache character length limit is in the vicinity of less than or equal to 2082 characters;

create a compressed hash value of the search query, wherein the compressed hash value comprises a compressed version of the search query wherein to create the compressed version of the received search query, the uncompressed URL is decrypted by the server;

generate a search result from the search query; and transmit, via the network, the search result and the compressed hash value to the client device for storage in a browser history cache of the client device wherein:

receiving the search query comprises the browser appending the one or more search terms to the URL inside an address bar within a browser window when the user enters the one or more search terms into a search bar within the browser window and transmitting the URL and the one or more search terms appended thereto when the user clicks a search button within the browser window; and the search result is displayed in a search results display area of the browser window wherein:

decrypting comprises compressing the search query using base 64 encryption protocols.

16. The non-transitory computer-readable medium having instructions of claim 15, further configured to cause the server to:

append the compressed hash value to the search result; and simultaneously transmit the compressed hash value and the search result to the client device.

* * * * *